(12) United States Patent
Dauneria et al.

(10) Patent No.: US 10,305,736 B2
(45) Date of Patent: May 28, 2019

(54) METHODS, NETWORK NODES, AND COMPUTER PROGRAM PRODUCTS FOR PRICE SIGNAL FEEDBACK FOR NETWORK OPTIMIZATION

(71) Applicant: Telefonaktiebolaget L M Ericsson (publ), Stockholm (SE)

(72) Inventors: Ankur Dauneria, New Delhi (IN); Sandeep Akhouri, New Delhi (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 649 days.

(21) Appl. No.: 14/574,996

(22) Filed: Dec. 18, 2014

(65) Prior Publication Data
US 2016/0182297 A1    Jun. 23, 2016

(51) Int. Cl.
| | | |
|---|---|---|
| *H04L 12/24* | (2006.01) | |
| *H04L 12/911* | (2013.01) | |
| *H04L 12/26* | (2006.01) | |
| *H04W 4/70* | (2018.01) | |
| *H04W 4/00* | (2018.01) | |

(52) U.S. Cl.
CPC ...... *H04L 41/0833* (2013.01); *H04L 41/0826* (2013.01); *H04L 41/0893* (2013.01); *H04L 41/0896* (2013.01); *H04L 47/70* (2013.01); *H04W 4/005* (2013.01); *H04W 4/70* (2018.02)

(58) Field of Classification Search
CPC ............ H04L 41/0833; H04L 41/0826; H04L 41/0893; H04L 41/0896; H04L 47/70; H04W 4/005
See application file for complete search history.

(56) References Cited

U.S. PATENT DOCUMENTS

| | | | | | |
|---|---|---|---|---|---|
| 2011/0188457 | A1* | 8/2011 | Shu | .................. | H04W 28/24 370/329 |
| 2012/0066686 | A1* | 3/2012 | Koch | .................. | G06Q 10/06 718/104 |
| 2013/0190032 | A1* | 7/2013 | Li | .................. | H04L 67/26 455/517 |
| 2014/0056149 | A1* | 2/2014 | Mani | .................. | H04L 12/569 370/235.1 |
| 2014/0223325 | A1* | 8/2014 | Melendez | .................. | G06F 3/1207 715/744 |
| 2015/0120673 | A1* | 4/2015 | Rolfe | .................. | G06F 11/1458 707/674 |
| 2015/0128283 | A1* | 5/2015 | Mashima | .................. | G06Q 10/10 726/26 |

(Continued)

*Primary Examiner* — Shean Tokuta
*Assistant Examiner* — Juan C Turriate Gastulo
(74) *Attorney, Agent, or Firm* — Patent Portfolio Builders, PLLC

(57) ABSTRACT

A method performed in a network operator server in communication with a utility server over a communication network, includes the network operator server receiving, from the utility server over the communication network, a utility message including an identification of at least one network device. The method further includes the network operator determining at least one network impact characteristic using the utility message. The method further includes the network operator server changing, in accordance with the at least one determined network impact characteristic, at least one network policy associated with the at least one network device.

21 Claims, 12 Drawing Sheets

(56) References Cited

U.S. PATENT DOCUMENTS

| | | | | |
|---|---|---|---|---|
| 2015/0134279 A1* | 5/2015 | Kim | G01R 21/1338 | 702/61 |
| 2015/0134280 A1* | 5/2015 | Narayan | H04L 67/141 | 702/62 |
| 2015/0282008 A1* | 10/2015 | Cao | H04W 4/005 | 370/310 |
| 2015/0373528 A1* | 12/2015 | Iwai | H04W 24/02 | 455/419 |
| 2016/0094662 A1* | 3/2016 | Kollu | H04L 45/745 | 709/224 |

* cited by examiner

METHODS, NETWORK NODES, AND COMPUTER PROGRAM PRODUCTS FOR PRICE SIGNAL FEEDBACK FOR NETWORK OPTIMIZATION

TECHNICAL FIELD

Disclosed herein are, for example, methods, network nodes, and computer program products price signal based feedback for network optimization.

BACKGROUND

Open Automated Demand Response (OpenADR) is an open and standardized way for electricity providers and system operators to communicate Demand Response (DR) signals with each other and with their customers using a common language over any existing IP-based communications network, such as the Internet. Demand Response plays a vital role in grid stabilization during hot summers, easing severely constrained electrical grids from coast-to-coast. Future energy crises caused by electricity demand exceeding system capacity can be postponed or even averted through Demand Response.

Demand Response (DR) services are used by utility power companies toward end consumers who are using home automation profiles to schedule particular device(s) at a time when electricity prices are low (i.e., below a particular price value). A user can perform the following actions during non-peak hours: (i) scheduling charging of Electric Car and Electric scooter both during low price hours; (ii) scheduling remote application provision in main powered M2M devices during low price hours in that location; (iii) scheduling application update during low price hours in main powered M2M device; (iv) scheduling P2P traffic in main powered P2P devices during low price hours; (v) scheduling watering of agriculture fields using main powered M2M device controlled watering system during low price hours; and (vi) scheduling washing of clothes in a connected main powered washing machine during low prices hours. FIG. 1 illustrates and example communication topology that implements the OpenADR specification. FIG. 2 illustrates an example OpenADR work flow with delayed start for a device.

The machine-to-machine (M2M) ecosystem is evolving rapidly and both consumer and industrial stationary main powered M2M devices are proliferating. Utility power companies (or Electric Power Houses) are increasingly using DR services to motivate users to cut electricity usage during peak hours by raising the prices to stabilize the electricity grid. Accordingly, during low price hours, consumers would heavily schedule most of their tasks (e.g., run multiple main powered devices, maximize implementation of otherwise low priority work, etc.) to save on energy cost.

The low price hours can be published in a price schedule. A price schedule can be published by a Demand Response Automation Server (DRAS), which may be operated by a utility power company, as per the grid need using DR events on an IP based network. The price schedule can be published per hour, per day/night, per week, per weekend/holidays, or even per season (summer, winter).

Based on the change in electricity prices for consumers, network operators would see large impact on network resources due to a number of main powered M2M devices connecting, disconnecting and reconnecting back to the 3GPP core network at a point in time as the price signal hits the network. Network operators spend $15 billion each year towards dealing with incidents of disruptions.

A connection management platform and network performance would be heavily impacted due to combined utility and user motivation to cut energy consumption. The relationship between electricity unit price signals broadcasted by the DRAS towards end consumers and sites, and its corresponding impact on the connection management platform and network performance needs to be understood to minimize the impact on the network operator's resources when the price signal hits the network. Accordingly, there is a need to minimize the impact of the DR Price signal on the network operator's network performance.

SUMMARY

According to some embodiments, a network operator server is in communication with a utility server over a communication network. A method performed in the network operator server includes the network operator server receiving, from the utility server over the communication network, a utility message including an identification of at least one network device. The method further includes the network operator determining at least one network impact characteristic using the utility message. The method further includes the network operator server changing, in accordance with the at least one determined network impact characteristic, at least one network policy associated with the at least one network device.

In some embodiments, a network operator server in communication with a utility server over a communication network includes a processor and a computer readable medium coupled to the processor. The computer readable medium contains instructions executable by the processor, whereby the network operator server is operative to: receive, from the utility server over the communication network, a utility message including an identification of at least one network device, determine at least one network impact characteristic using the utility message, and change, in accordance with the at least one determined network impact characteristic, at least one network policy associated with the at least one network device.

In some embodiments, a computer product for a network operator server includes a non-transitory computer readable medium storing computer instructions for receiving, from the utility server over the communication network, a utility message including an identification of at least one network device, determining at least one network impact characteristic using the utility message, and changing, in accordance with the at least one determined network impact characteristic, at least one network policy associated with the at least one network device.

BRIEF DESCRIPTION OF THE DRAWINGS

The accompanying drawings, which are incorporated herein and form part of the specification, illustrate various embodiments.

DETAILED DESCRIPTION

Embodiments are directed to DR Price Signal based feedback for 3GPP Network optimization. Embodiments include identification, differentiation, prioritization and execution to optimize network performance.

Figure 1:
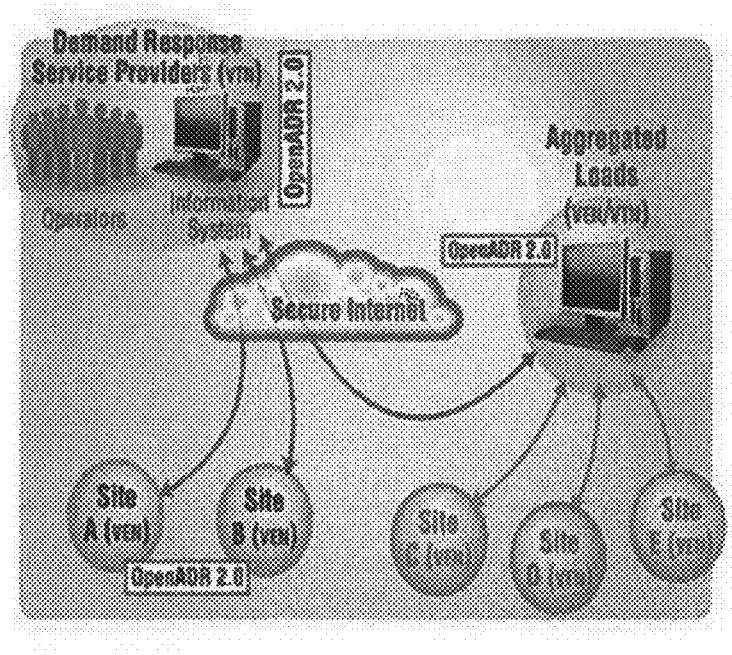
FIG. 1 illustrates an example communication system that implements the OpenADR specification.
Figure 2:
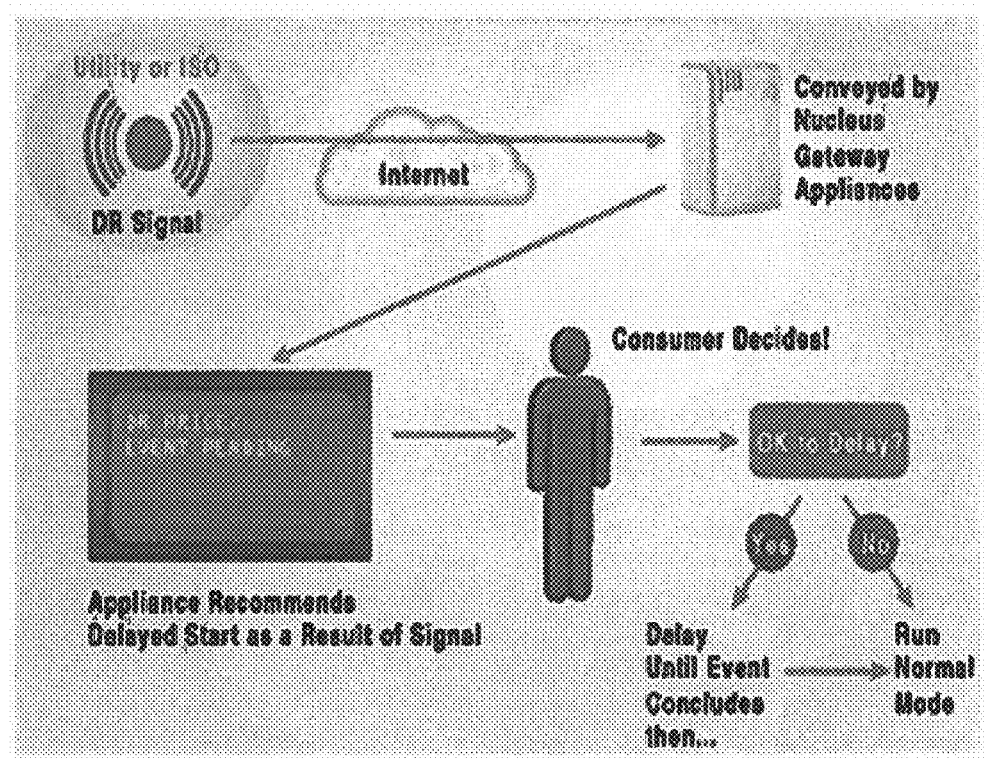
FIG. 2 illustrates an example OpenADR work flow.
Figure 3:
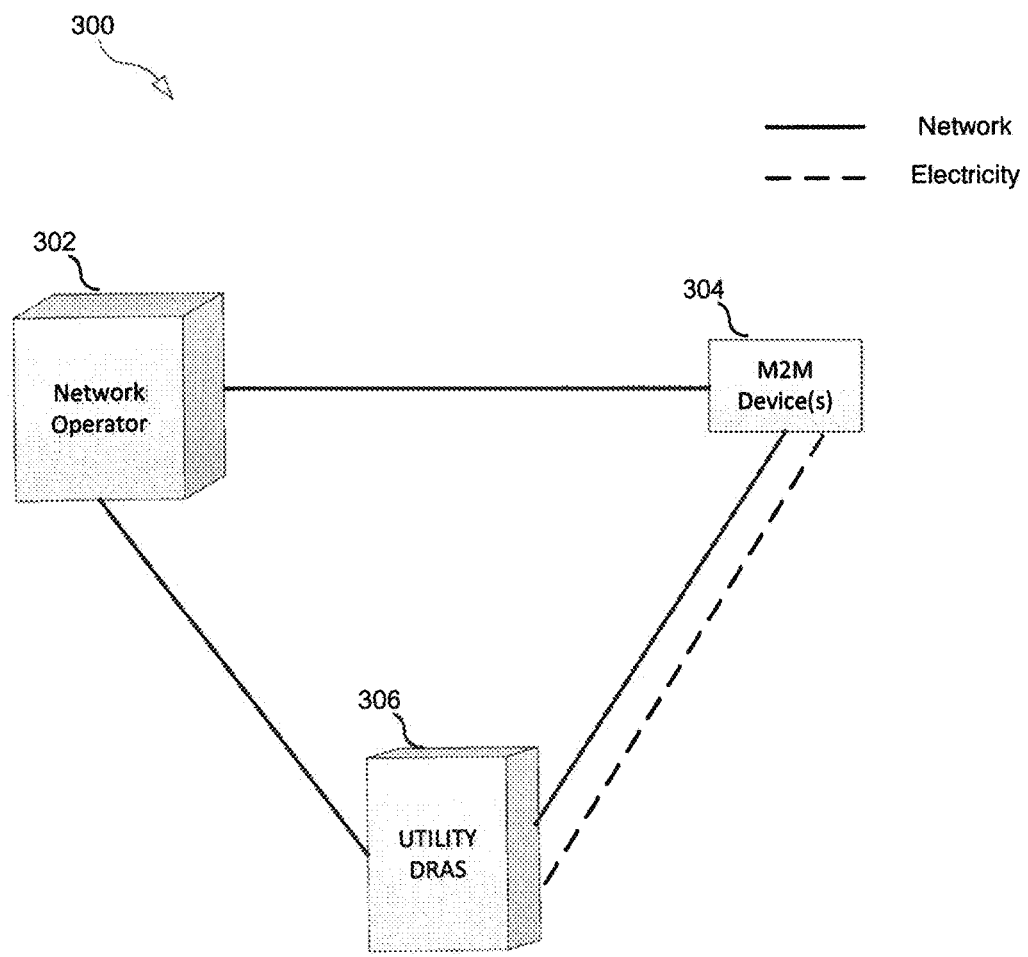
FIG. 3 illustrates an exemplary network and power flow.

FIG. 3 illustrates an example communication and network flow between network operator server 302, one or more M2M devices 304, and utility DRAS 306. As illustrated in FIG. 3, power (i.e., electricity) is provided from the utility DRAS to the one or more M2M devices 304. Furthermore, network connectivity is provided between the network operator 302, the one more M2M devices 304, and the utility DRAS 306. As an example, the network operator 302, the one more M2M devices 304, and the utility DRAS 306 may communicate with each other over a communication network. Although there is one network server and one DRAS illustrated in FIG. 3, it is understood by one of ordinary skill in the art that the system can include a plurality of network servers and a plurality of utility servers in communication with each other, where each utility server may be associated with a separate utility company.

Figure 4:
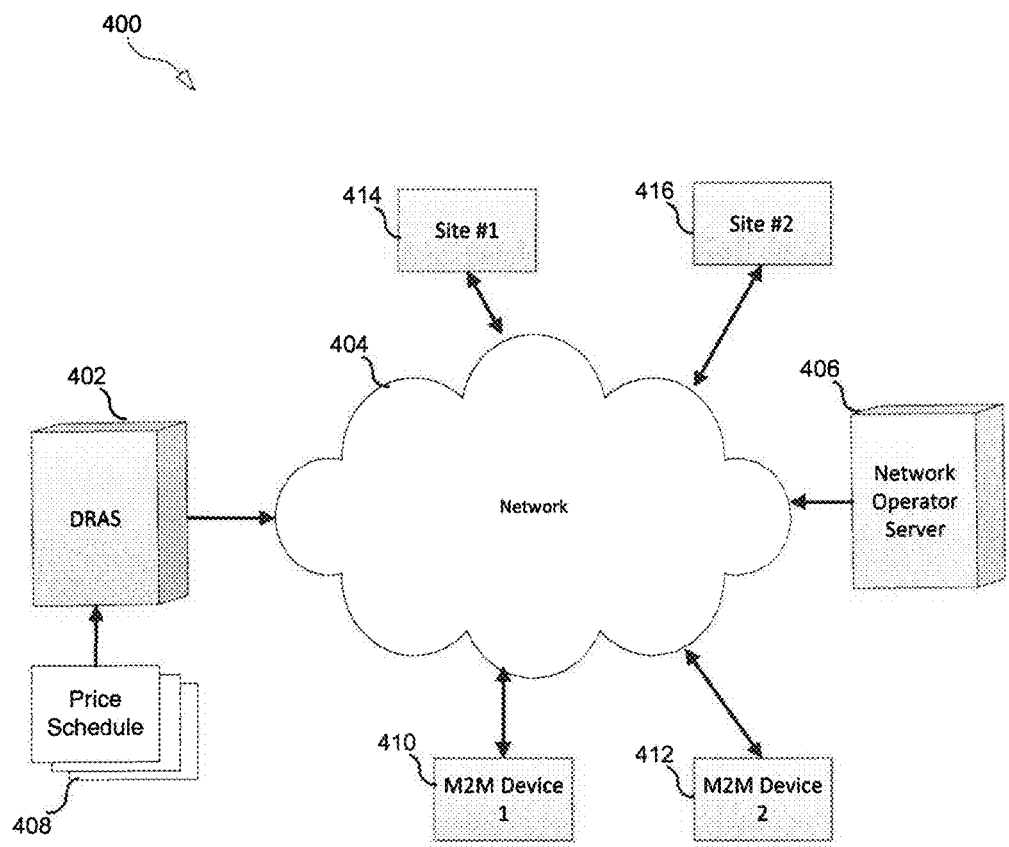
FIG. 4 illustrates an exemplary communication system according to some embodiments.

FIG. 4 illustrates an exemplary communication system 400 according to some embodiments. The communication system 400 includes a DRAS 402 in communication with a network 404. The communication system further includes a network operator server 406 in communication with the network 404. The communication system further includes M2M devices 410 and 412, and sites 414 and 416 in communication with the network. Sites 414 and 416 may contain one or more M2M devices in communication with network 404. For example, sites 414 and 416 may be a vehicle charging stations in which one or more electric vehicles are communicating with the DRAS 402 and network operator server 406 over the network 404 while charging. As another example, sites 414 and 416 may be laundromats in which one or more washing machines and/or dryers are communicating with the DRAS 402 and network operator server 406 over the network 404. Other examples of M2M devices include, but are not limited to, computer terminals, laptops, tablet devices, and network nodes such as routers, hubs, switches, sensors, actuators, 3GPP or non-3GPP devices that are mobile or stationary or battery powered or main powered, and devices which are based on ETSI or any other standardized specification known to one of ordinary skill in the art that enables communication with other M2M devices over a network. In some embodiments, the DRAS 402 periodically receives one or more price schedules 408 that are broadcasted to the M2M devices 410 and 412 and the sites 414 and 416.

In some embodiments, the M2M devices 410 and 412 and sites 414 and 416 are connected to the network 404 via a local area network (LAN). In some embodiments, the M2M devices 410 and 412 and sites 414 and 416 are connected to the network 404 via a WLAN. In some embodiments, the M2M devices 410 and 412 and sites 414 and 416 are connected to the network 404 via 3GPP connection. In some embodiments, the network 404 is the internet.

Figure 5:
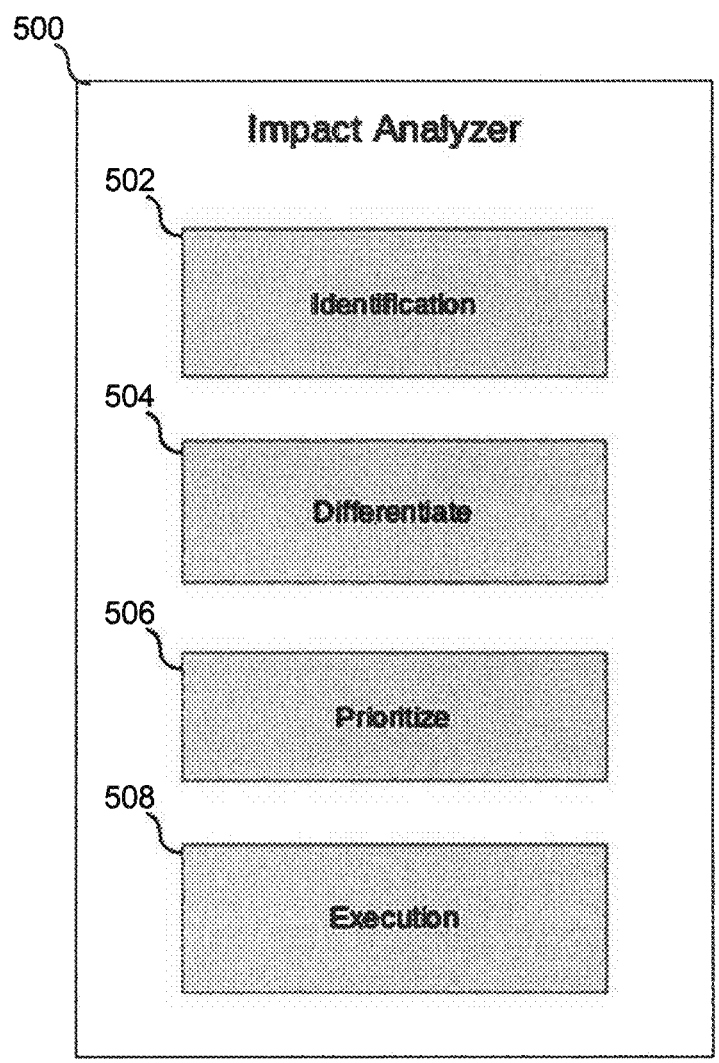
FIG. 5 illustrates an exemplary communication between the DRAS and network operator server.

FIG. 5 illustrates an embodiment of an impact analyzer 500 included in the network operator server. The impact analyzer includes an identification module 502, a differentiation module 504, a prioritization module 506, and an execution module 508. Each module included in the impact analyzer 500 may be implemented in software, implemented as a hardware (i.e., individual ASIC), or a combination of both. In some embodiments, the impact analyzer uses information received from the utility company to determine the effect of price signals on network performance.

Figure 6:
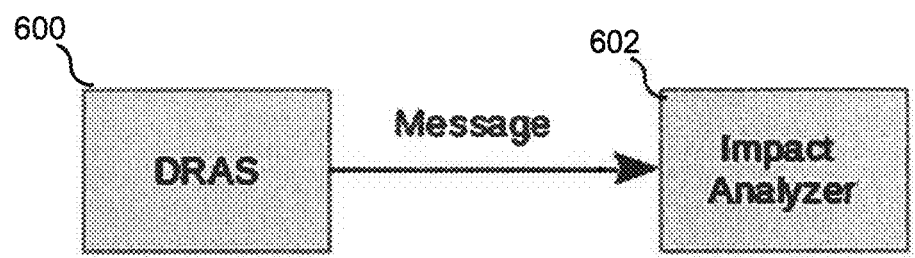
FIG. 6 illustrates an exemplary network operator server configuration.

In some embodiments, the network operator server receives a message from the DRAS server as illustrated in FIG. 6, in which DRAS 600 transmits a message to impact analyzer 602. The message received from the DRAS 600 may include one or more of the following information: (i) total number of main powered M2M Devices; (ii) number of impacted M2M devices enrolled in a DR service profiles; (iii) network identities of M2M devices; (iv) M2M Device state with price relationship (ON, OFF) table ('ON' state means consuming electricity and 'OFF' state means not consuming electricity or consuming reduced electricity such as a standby mode); (iv) DR price signal detail; (v) timestamp of signal; and (vi) schedule of sending of signal. In some embodiments the DR price signal detail includes price per unit of electricity, currency information, unit in which electricity is measured, event id, date, timestamp, duration of event, event priority, etc.

The OpenADR specification works on IP based connectivity. Accordingly, recipient devices network identity in an IP based network can be determined. In some embodiments, the DRAS creates DRAS profiles that have the information about the sites, main powered M2M devices, which are recipient of DR price events broadcasted by the utility company or DRAS.

In some embodiments, when the network operator server is provided the network device identities included in the message from the DRAS, the network operator server uses these identities to generate M2M device characteristics and attributes about the M2M devices. In some embodiments, the network operator server can use the ETSI M2M functional specification to identify and characterization of M2M devices. As an example, based on the message from the DRAS, the identification module 502 determines one or more of the following: (i) Application identifier (App-ID); (ii) SCL identifier (SCL-ID); (iii) M2M node identifier (M2M-Node-ID); (iv) M2M Service Connection identifier (M2M-Connection-ID); (v) M2M Service Provider identifier (M2M-SP-ID); (vi) MSBF identifier (MSBF-ID); and (vii) M2M Subscription ID.

According to some embodiments, based on information determined by the identification module 502, the differentiation module 504 determines one or more impact calculations. The impact calculation quantifies, for example, the effect of a DR price signal on network performance. The impact calculation may be determined per DR price category per hour or per unit time. In some embodiments, the impact calculation includes determining a percentage of number of main powered M2M devices that connect to the network upon reception of a DR price event (i.e., % connect) as follows:

$$\frac{\text{Number of new connected main powered } M2M \text{ devices}}{\text{Total number of main powered } M2M \text{ devices}} \times 100$$

The % connect is associated with the number of new main powered M2M devices that have not previously connected to the network. In some embodiments, the impact calculation includes determining a percentage of the main powered M2M devices that disconnect from the network upon reception of a DR price event (i.e., % disconnect) as follows:

$$\frac{\text{Number of new disconnected main powered } M2M \text{ devices}}{\text{Total number of main powered } M2M \text{ devices}} \times 100$$

In some embodiment, the impact calculation includes determining a percentage of main powered M2M devices that reconnect to the network upon reception of a DR price event (% reconnect) as follows:

$$\frac{\text{Number of new reconnected main powered } M2M \text{ devices}}{\text{Tota lnumber of main powered } M2M \text{ devices}} \times 100$$

Based on the impact calculations including % connect, % disconnect, and % reconnect, the network operator can predict network usage based on a particular DR price signal. In some embodiments, the main powered devices are those devices which support demand response services. As an example, a main powered M2M may be a washing machine, and a non-main powered M2M device may be a battery operated device such as a sensor. When main powered devices go offline or disconnect, for example, on reception of a DR price signal, the saved network resources could be diverted to better support other devices that are battery powered and are attached to the network at that time. Although the impact calculations listed above are for main powered devices, it is understood by one of ordinary skill in the art that the impact calculations are not limited to main powered devices and can be determined for all M2M devices.

According to some embodiments, the differentiation module 504 can further differentiate the impact calculations, using the M2M ecosystem identities as criteria, as follows: (i) determine % connect as per type of devices (edge, nodes, device attributes), services, applications per broadcasted price category; (ii) determine % disconnect as per type of devices (edge, nodes, device attributes), services, and applications per broadcasted price category; and (iii) determine % reconnect as per type of devices (edge, nodes, device attributes), services, and applications per broadcasted price category. In some embodiments, the differentiation module 504 can further determine a % change (connect, disconnect, and reconnect) per service capability layer, per subscription, per service provider, groups/communities per broadcasted price category, etc. The % change can indicate an amount of change in % connect, % disconnect, and % reconnect from a previous calculation.

Based on the impact calculations, the network operator understands the changing trends of device connections, disconnections and re-connections on the connection management platform and overall network performance in the M2M ecosystem. For example, when the network operator determines that particular devices are coming on-line based on a particular DR price signal, the network operator can predict the usage of network resources when this particular DR price signal hits the network.

In some embodiments, the differentiation module 504 determines disruptive price categories. The disruptive price categories may specify specific price categories that heavily impact the network performance of the network operator. As an example, the disruptive price categories are those price categories which result in maximum devices going off-line or coming on-line at a point in time.

In some embodiments, the network operator server determines an impact list, which is a list of main powered M2M devices. The impact list may include the list of devices that are impacted when the price signal hits the network. The impact list may be determined in accordance with the % connect, % disconnect, and % re-connect calculations. For example, if the % connect for a device type is above a network operator defined threshold, then M2M devices of the same device type may be included on the impact list. The % impact indicates the change with respect to total devices. The criteria may be defined by the network operator, which may be used to interpret the impact calculations. The impact list can be further organized according to network operator policies. For example, network operator policies can organize, in accordance with price category changes, the impact list based on M2M ecosystem identities such as per device type, per service type, and per application type. As an example, the M2M ecosystem identities include one or more of the following: (i) application identifier; (ii) Service Capability Layer (SCL) identifier; (iii) M2M node identifier; (iv) M2M Service Connection identifier; (v) M2M Service Provider identifier; (vi) MSBF identifier; (vii) M2M Subscription ID.

According to some embodiments, the prioritization module 506 uses the impact lists, impact calculations, and criteria as feedback to create policies. The criteria can include categories which can by used by the network operator to categorize the impact according to: (i) device type, (ii) device group, (iii) application type, (iv) service type, (v) subscription type, (vi) service capability layer type, (vii) M2M node, (viii) service provider type, (ix) traffic class type, and (x) location. As an example, the prioritization module 506 creates network policy profiles using the impact lists, impact calculations, and criteria to allocate bandwidth, QoS, and charging as the DR Price signal hits the network from the DRAS. The prioritization module 506 can use predetermined rules specified by the network operator that related to bandwidth allocation, up-link traffic prioritization, differentiation, peak load time/hours, etc. In some embodiments, a connection management platform has extensive schedules for contacting devices for configuration management, data collection, assurance and software management. Significant network resources are utilized to contact devices across geographies. Based on the feedback received, the connection management platform designer can develop policies for better management.

In some embodiments, the execution module 506 activates a rule or appropriate network policy profile to prioritize the traffic and adapt the network traffic as the DR price signal hits the network. As an example, the rule or network policy profile can specify which M2M devices specified in the impact list receive a network policy adjustment when the DR price signal hits the network. As an example, the network policy adjustment can be a change in bandwidth allocation. The rule or network policy profile can also be used for devices that are not on the impact list. For example, if a number of devices are going offline, then the amount of bandwidth saved can be used toward servicing devices, applications, or service currently connected. Similarly, if a number of devices are coming online, bandwidth can also be allocated to servicing devices, applications, or service currently connected.

Figure 7:
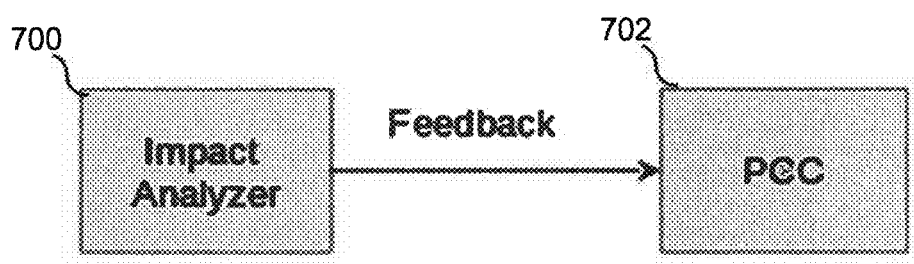
FIG. 7 illustrates an exemplary communication between the network operator server and a policy charge control node.
Figure 8:
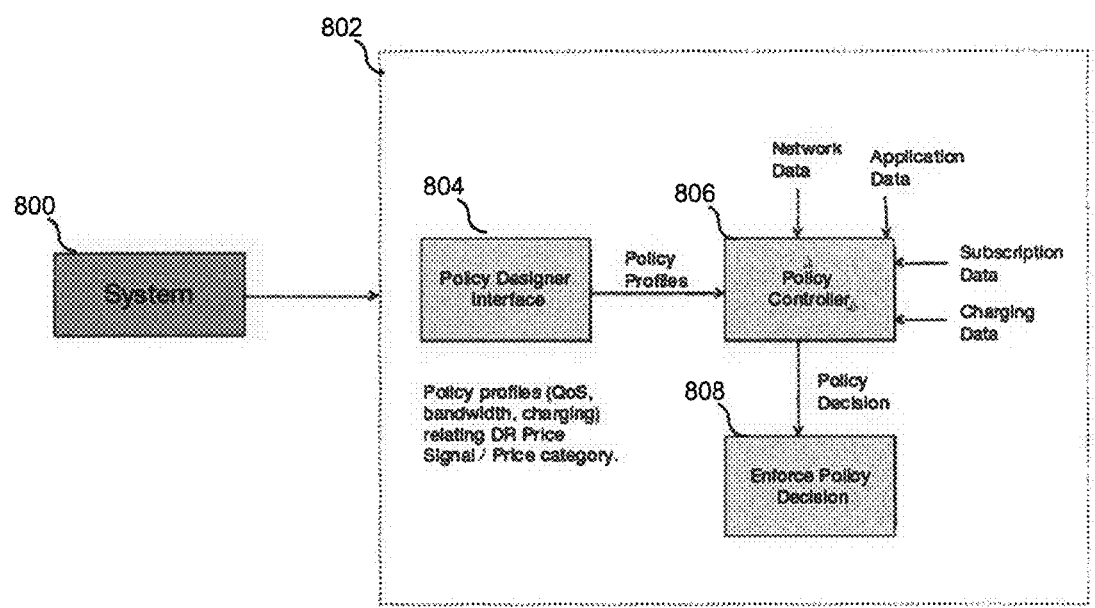
FIG. 8 illustrates an exemplary system configuration.

In some embodiments, the network operator server forwards the impact lists, impact calculations, and criteria to a policy charging and control (PCC) node, where the PCC node creates a PCC rule or network policy profile for using the impact lists, impact calculations, and criteria to allocate bandwidth, QoS, and charging as the DR Price signal hits the network from the DRAS. FIG. 7 illustrates an embodiment in which an impact analyzer 700 provides information to the PCC 702. This information may include the impact lists, impact calculations, and criteria. FIG. 8 illustrates an embodiment in which the network operator system 800 is in communication with PCC 802. As illustrated in FIG. 8, the PCC 802 includes a policy designer interface 804, a policy controller 806, and a policy enforcer 808. The policy controller 806 may receive one or more policy profiles from the policy designer interface 804 in addition to network data, application data, subscription data, and charging data. Based on this information, the policy controller 806 may determine one or more policy decisions that are forwarded to the policy enforcer 808. As an example, the policy controller 806 detects a price signal using the network data and activates a stored PCC profile related to the price signal.

Major metropolitan areas with millions of people would see improved network performance based on the network operator server implementing the advantageous embodiments disclosed herein such as the network operator server implementing the impact analyzer. As an example, a major metropolitan area like New Delhi comprises 17 million people. Each household in this metropolitan area has multiple M2M devices enrolled in Demand Response services provided by the utility companies.

Suppose each household has a LTE router acting as Gateway device (i.e., edge based M2M device) connected with multiple M2M devices (nodes) using various protocols (constrained or non-constrained). These devices are enrolled in DR services. As an example, constrained protocols are those which are used for communication between M2M devices in M2M area network, which includes, for example, CoAP, Lightweight M2M, etc.

Since the utility companies publish price signals with varying prices according to peak and off-peak usage, multiple users across the metropolitan area would have scheduled, through automated profiles, charging of their Electric Vehicles (EV) during off peak hours, i.e. when electricity prices broadcasted by utility power companies are low. When the EVs are charging, they are also sending vehicle maintenance data through the 3GPP network to, for example, a user defined database (Dropbox account), or to the vehicle manufacturer or auto maintenance company that collects maintenance data. Furthermore, during the same off peak hours, users have also scheduled washing of clothes by connected washing machines, P2P downloads by P2P main powered devices, or any other activity of M2M devices that are benefited by the lower electricity prices during off peak hours.

When the DR price signal hits the network from the DRAS, the price signal impacts the network performance of the metropolitan area since the metropolitan area has millions of users with each user having multiple devices using network resources. As an example, a city with 17 million people may see hundreds of millions of M2M devices using network resources as the DR price signal hits the network.

One example of an effect on network performance includes the volume of data transfer relating to number of main powered devices connected to LTE router is impacted (i.e., congestion and bandwidth utilization is impacted at the network operator's end. Another example of an effect on network performance includes impact of peak load time based on DRAS specific peak rates, discounts offered, and user enrollment into particular price categories. Another example of an effect on network performance includes up-link and down-link traffic congestion relating to data transfer size concerning number of devices behind the LTE router gateway. Network performance may further be impacted based on the number of M2M devices connecting, disconnecting, and again re-connecting. Additionally, multiple device registrations and authentication procedures further impacts network performance.

Based on the significantly advantageous embodiments disclosed herein, the network operator can plan for network optimization during DR Price signals triggered by the DRAS. For example, the network operator can develop policies relating to managing traffic, QoS, bandwidth allocation relating to number of devices affected, types of traffic supported by those devices affected, types of services, applications affected, etc.

According to some embodiments, upon reception of a message from the utility company domain or DRAS, the 3GPP network operator server uses information included in the message details to determine (using, for example, Core/M2M network knowledge) M2M ecosystem relevant identities at locations associated with the main powered M2M devices, price and energy consumption relationship, frequency and timing of DR Price signals. The network operator server then formulates feedback that includes, for example, impact lists, impact calculations, and criteria.

As an example, the impact list is a list of DR price signal based impacted M2M devices that is determined based on operator criteria. The criteria includes, for example, device type, device attributes, service based, application based, subscription based, service provider based, traffic class, traffic volume, etc. or additional M2M ecosystem based identities disclosed above. Examples of impact lists include:

An application based list of affected M2M devices;
A service based list of affected M2M devices;
A service capability layer based list of affected M2M devices;
A subscription based list of affected M2M devices;
A service provider based list of affected M2M devices;
An overall location based lists of affected M2M devices;
A list of network connections/sessions toward affected M2M devices;
List of Devices as per traffic class such as video based devices;
List of network connection specific UL/DL (traffic impacts) towards affected M2M devices.

For each impact list, the network operator can understand the percentage of new M2M devices connecting to the network, the percentage of M2M devices disconnecting from the network, and the percentage of devices re-connecting to the network to quantify the impact on network performance as the DR price signal hits the network. The % impact indicates a percentage of a number of devices connecting, disconnecting, or reconnecting out of a total number of devices. For example, if % x m2m devices disconnect on receipt of a DR Price Signal from a Utility Server(s), then the network operator may use categories (or criteria) to determine the impact as per device type, m2m application type, service type, network traffic class type, subscription type, etc., which are associated with those disconnecting m2m devices as % x devices goes off-line at once or at time schedule on receipt of a DR Price signal from Utilities server(s) (or DRAS).

This cumulative feedback quantifying the impact caused by the DR price signal on the network is provided, for example, to the PCC node's or connection management platform's policy designers. The PCC Policy design may use this feedback to construct various policy profiles relating to QoS, bandwidth, and charging policies in relation to the impact of the DR price signal impacts. For example, policies may be developed relating to change in volume of traffic (UL/DL) per traffic class based on the impact of the price signal on main powered M2M devices during peak vs non-peak hours.

In some embodiments, the DR price signal impact based policy profiles become active (i.e., instantly or according to a pre-determined time schedule) when the network operator server (or PCC/PCRF) gets a feedback from the impact analyzer processing component. Based on this feedback, for example, appropriate policy profiles are activated and policy decision(s) are shared with a policy enforcing entity such as a Policy Control Enforcement Function (PCEF) node, which enforces the decisions on the platform, traffic, etc., and then forwards those decisions to the gateway.

As an example, if a few million devices relating various applications, services, traffic classes comes online at once at various locations during low electricity price hour(s), the feedback generated by the impact analyzer per price signal in the network operator domain is provided to the PCC to generate policy profiles for not just M2M devices, but also in relation to affected network resources, services, applications, connections/sessions, UL/DL traffic (to/from Devices, applications) affected, payload volumes etc. According to some embodiments, based on the network operator's strategies, PCC rules or policy profiles become activated in real time or in accordance with a specific time schedule based on the same types of prices, signals, etc.

The rules and network operator policies can further be based on, in some embodiments, network traffic management, consumers, subscribers, etc. For example, a rule or policy can be subscription based (i.e., Gold Category, Silver Category, Bronze category), where particular subscription categories have a higher priority compared to other subscription categories. For example, when the DR price signal hits the network, the rules or policy provides may specify that gold category subscribers may receive an allocation of bandwidth before the silver and bronze category subscribers. As another example, the rule or policy can be application based (i.e., type of applications, type of application traffic). For example, the rules or policy profiles may specify that some applications may have a higher prioritization with respect to other applications with respect to allocation of network resources when the DR price signal hits the network.

The rules and policy profiles improves network performance by giving QoS, bandwidth priority or de-priority to network traffic (as per different traffic classes) relating to subscriber profiles, which gets affected by millions of devices coming online during low price hours at various locations as the price signals hits the network. Based on the feedback from the impact analyzer, the network operator can understand which applications, application-based traffic (e.g., uplink traffic, downlink traffic, etc.) and related application-based traffic classes will be impacted by specific DR price signals during peak vs non-peak hours. Based on the feedback from the impact analyzer, the network operator can prioritize/de-prioritize traffic, allocate bandwidth relating to services/applications/subscription when the price signals hits the network. Furthermore, the network operator can develop separate PCC rules/profiles for network management, policy control, and charging during peak vs non-peak hours (i.e. high price or low price hours).

Figure 9:
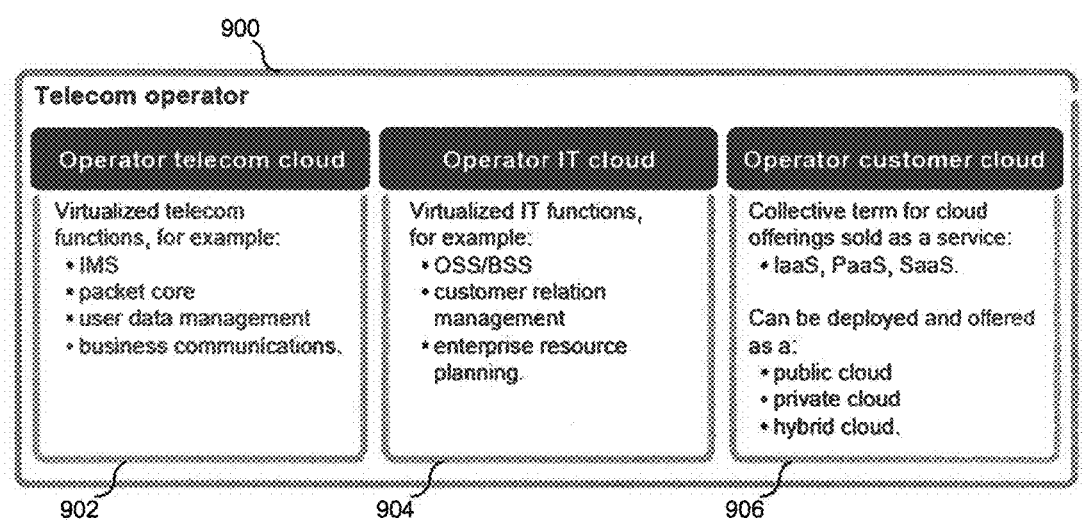
FIG. 9 illustrates and exemplary network cloud deployment.

The embodiments disclosed herein are also applicable to cloud-based services. Cloud-based services provide an opportunity for network operators to add value and improve the timeliness and quality with which they deliver enterprise services and applications—whether through more efficient telecom and internal IT services or value-added cloud services for consumers and enterprises. Cloud-based services also allow operators to ensure rapid service creation and roll-out by delivering new levels of flexibility, scalability and responsiveness. Cloud-based services satisfy growing user expectations for new innovative services with high QoE, while handling ever-increasing traffic loads. FIG. 9 illustrates example cloud-based scenarios 900 including an operator telecom cloud 902, an operator IT cloud 904, and an operator customer cloud 906.

In some embodiments, the Cloud system may use impact feedback containing impacted M2M devices, impacted network sessions/connections details, impacted traffic classes, impacted traffic volume, impacted services and applications and % impact, criteria as per price signals to translate that feedback into cloud based virtual resources allocation or free-up in virtualized environment via profiles as per changing demands. The Cloud system can develop automation profiles in a virtualized environment using the impact feedback to translate the feedback into allocation or release of resources relating to applications, services, storages, processing power, memory etc. The could operator, which may be a network operator, can scale resources up or down in response to changing demands in real time or as per time based schedule in price signals.

As an example, if millions of M2M devices are coming on-line during low price hours in several locations, the cloud based environment would need intelligence on how to raise the elasticity or scale up in such scenarios (i.e., increase available cloud resources). Based on the impact feedback, the number of virtual machines relating to storages, processing power, servers, memory, etc. can be increased (or registered) as per surge in number of devices coming on-line or corresponding increase in traffic (traffic classes, application/service), or increase in load on network during low price hours. In some embodiments, the impact feedback provided by the impact analyzer may be provided to Cloud based mathematical models, which controls its 'elasticity' to adapt.

For Operators there will be: (i) cloud based applications/services specific impact due to price signals; (ii) connection management platform specific impact due to price signals; (iii) network traffic load (UL/DL) specific impact due to price signals; and (iv) network node/servers related to impact due to price signals. Network traffic load specific virtual resource requirements may be based on the nature of the impacted traffic class, type of traffic, Up-link (UL)/Down-Link (DL) volume of traffic change relating to applications (i.e., traffic volume changes during peak hours vs non-peak hours).

According to some embodiments, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service. Automation profiles in the virtualized environment prevent the cloud operator from having to build extra capacity to handle extreme load situations.

Figure 10:
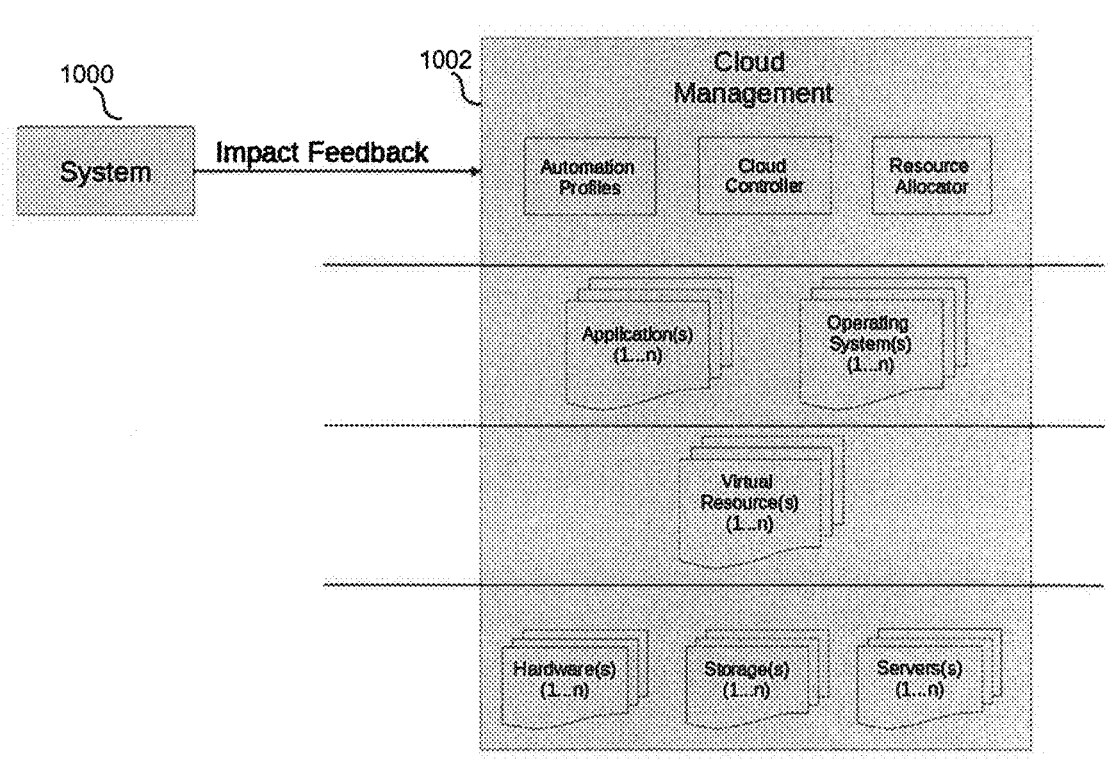
FIG. 10 illustrates an exemplary network cloud configuration.

FIG. 10 illustrates an embodiment of the system 1000 including the impact analyzer providing DR Price signal based Impact Feedback to a cloud management unit 1002. A processing component of the unit 1002 receives the feedback and executes an appropriate automation profile based on the feedback. In some embodiments, the cloud management unit 1002 processing component can employ mathematical model(s) controlling the elasticity of cloud in terms of virtual resource(s) like adding more processing power, storages, virtual machines, application instantiations. In cloud computing, elasticity is defined as the degree to which a system is able to adapt to workload changes by provisioning and De-provisioning resources in an autonomic manner, such that at each point in time the available resources match the current demand as closely as possible. Elasticity aims at matching the amount of resources allocated to a service with the amount of resources it actually requires, avoiding over- or under-provisioning. Over-provisioning (i.e., allocating more resources than required) should be avoided as the service provider often has to pay for the resources that are allocated to the service). Under-provisioning (i.e., allocating fewer resources than required) must be avoided, otherwise the service cannot serve its users with a good service. Resource allocator would allocate or free up virtual resources as demand surge or wanes.

In some embodiments, automation profile(s) relating to cloud elasticity/scalability are designed in accordance with the impact feedback provided by Impact analyzer in cloud based environment to manage changing demands per price signal based impact feedback. The automation profiles provides strategy to scale in/out, parameters/constraints, monitoring aspect, etc. to manage the needs for virtual resources catering to connection management platform based impact, network traffic load (UL/DL) related impact and cloud based application/services related impact during peak vs non-peak hours.

Figure 11:
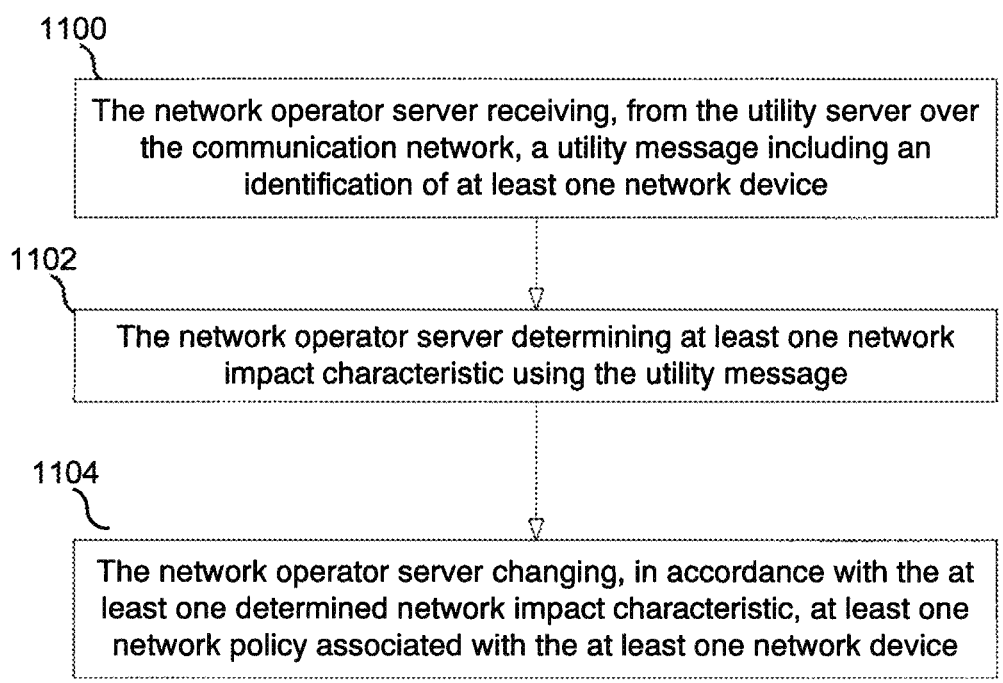
FIG. 11 is a flow chart illustrating a process according to some embodiments.

FIG. 11 illustrates an embodiment of a process performed by the network operator server such as server 406. The process may start at step 1100 where the network operator server receives, from the utility server over the communication network, a utility message including an identification of at least one network device. In step 1102, the network operator server determines at least one network impact characteristic using the utility message. In step 1104, the network operator server changes, in accordance with the at least one determined network impact characteristic, at least one network policy associated with the at least one network device.

In some embodiments, the utility message includes information associated with an electricity consumption price signal transmitted from the utility server to the at least one network device over the communication network.

In some embodiments, the utility message further includes a state of the at least one network device.

In some embodiments, the state specifies a network device being one of an "on" state in which the network device consumes electricity, an "off" state in which the network device does not consume electricity, and a "standby" state in which electricity consumption by the network device is reduced with respect to the "on" state.

In some embodiments, the utility message includes a list of identities of a plurality of network devices.

In some embodiments, based on the list of identities of the plurality of network devices included in the utility message, the network operator server organizes the plurality of network devices into one or more profile categories including: (i) device type, (ii) device group, (iii) application per broadcasted price category, (iv) machine to machine (M2M) ecosystem identities including one or more of an Application identifier, a Service Capability layer identifier, a M2M node identifier, a M2M Service Connection identifier, a M2M Service Provider identifier, and a MSBF identifier, and M2M Subscription identifier), (v) application type, (vi) service type, (vii) location/area identifiers, (viii) user/subscriber community identifiers, (ix) traffic classes supported by devices, and (x) device priorities.

In some embodiments, the determining the at least one network impact characteristic includes determining from the plurality of network devices a percentage of new devices connected to the communication network upon reception of the electricity consumption price signal.

In some embodiments, the percentage of new devices connected to the communication network is determined for each profile category.

In some embodiments, the determining the at least one network impact characteristic includes determining from the plurality of network devices a percentage of devices that disconnected from the communication network upon reception of the electricity consumption price signal.

In some embodiments, the percentage of devices that disconnected from the communication network is determined for each profile category.

In some embodiments, the determining the at least one network impact characteristic includes determining from the plurality of network devices a percentage of devices that reconnected to the communication network upon reception of the electricity consumption price signal.

In some embodiments, the percentage of devices that reconnected to the communication network is determined for each profile category.

In some embodiments, the network operator server changing the at least one network policy associated with the at least one network device includes (i) readjusting a network bandwidth allocation for the at least one network device, (ii) readjusting a quality of service requirement for the at least one network device, or (iii) readjusting a charging policy for the at least one network device.

In some embodiments, the network bandwidth allocation for the at least one network device is readjusted in accordance with a subscription level of the at least one network device.

In some embodiments, the network bandwidth allocation for the at least one network device is readjusted in accordance with an application that is executed by the at least one network device.

In some embodiments, the utility message includes a schedule for the electricity consumption price signal, wherein the method further comprises the network operator server transmitting, to the at least one network device, information indicative of the change in the network policy in accordance with the schedule.

In some embodiments, the at least one network device is a machine to machine (M2M) device including one of (i) an electric vehicle, (ii) a consumer appliance, (iii) a network node and (iv) other main-powered mobile or stationary m2m devices.

In some embodiments, the network operator server is a network cloud management unit.

In some embodiments, the network cloud management unit allocates cloud resources in accordance with the determined at least one network impact characteristic.

In some embodiments, the network operator server is a policy charging control node.

In some embodiments, the network operator server is a connection management platform.

In some embodiments, the utility server is a Demand Response Automation Server (DRAS) operating an openADR protocol.

Figure 12:
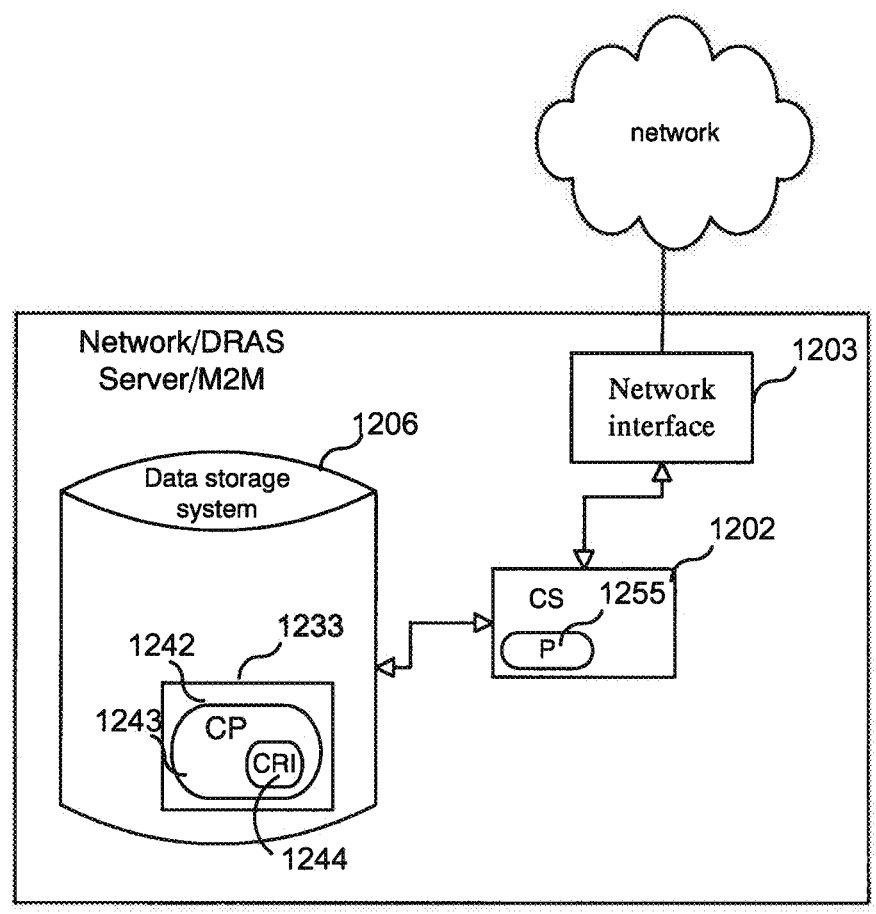
FIG. 12 is a block diagram of a server according to some embodiments.

FIG. 12 is a block diagram of an embodiment of a network server or DRAS. The structure of FIG. 12 is also an example of an M2M device. As shown in FIG. 12, the server may include or consist of: a computer system (CS) 1202, which may include one or more processors 1255 (e.g., a general purpose microprocessor) and/or one or more circuits, such as an application specific integrated circuit (ASIC), field-programmable gate arrays (FPGAs), a logic circuit, and the like; a network interface 1203 for use in connecting the server to a network; and a data storage system 1206, which may include one or more non-volatile storage devices and/or one or more volatile storage devices (e.g., random access memory (RAM)). In embodiments where the server includes a processor 1255, a computer program product (CPP) 1233 may be provided. CPP 1233 includes or is a computer readable medium (CRM) 1242 storing a computer program (CP) 1243 comprising computer readable instructions (CRI) 1244. CRM 1242 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1244 of computer program 1243 is configured such that when executed by computer system 1202, the CRI causes the server to perform steps described above (e.g., steps described above with reference to the flow charts and message flows shown in the drawings). In other embodiments, the server may be configured to perform steps described herein without the need for a computer program. That is, for example, computer system 1202 may consist merely of one or more ASICs. Hence, the features of the embodiments described herein may be implemented in hardware and/or software.

The advantages of the embodiments disclosed herein include providing a system that accounts for impact on network performance based on actions taken by utility power companies. Further advantages include providing network operators the ability to adapt with electricity price DR signals broadcasted by utilities (i.e., DRAS) towards end consumers based one location and time. Further advantages include improved planning and forecasting for up-link traffic prioritization and congestion management relating to device (both edge or node) connection, disconnection, and re-connection patterns.

Further advantages include improving the network operator's ability to better plan network capacity and bandwidth to stabilize network performance as price signals hit the network. Further advantages include the ability to create profiles based on impact feedback so that the network operator can better plan activities based on DR signal time and schedule. Additional advantages include providing the network operator improved ability to plan for and avoid network outages.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

ADR Automated Demand Response
DR Demand Response
DRAS Demand Response Automation Server

The invention claimed is:

1. A method performed in a network operator server in communication with a utility server over a communication network, the method comprising:
   receiving, at the network operator server, a utility message including a list of identities of a plurality of network devices and a schedule for an electricity consumption price signal, from the utility server over the communication network;
   determining, by the network operator server, at least one network impact characteristic using the utility message, wherein determining the at least one network impact characteristic includes determining, from the plurality of network devices, a percentage of network devices that are reconnected to the communication network upon reception of the electricity consumption price signal;
   generating, by the network operator server, characteristics and attributes of at least one network device of the plurality of network devices based on the list of identities of the plurality of network devices;
   changing, by the network operator server, at least one network policy associated with the at least one network device in accordance with the determined at least one network impact characteristic, and the characteristics and attributes of the at least one network device, wherein changing the at least one network policy associated with the at least one network device includes readjusting a charging policy for the at least one network device; and
   transmitting, according to the schedule for the electricity consumption price signal included in the utility message, information indicative of the change in the at least one network policy, to the at least one network device, wherein the at least one network device is a machine to machine (M2M) device including one of: (i) an electric vehicle, (ii) a consumer appliance, (iii) a network node, and (iv) other main-powered mobile or stationary M2M devices.

2. The method according to claim 1, wherein the utility message further includes a state of the at least one network device.

3. The method according to claim 2, wherein the state specifies a network device being in one of: an "on" state in which the network device consumes electricity, an "off" state in which the network device does not consume electricity, and a "standby" state in which electricity consumption by the network device is reduced with respect to the "on" state.

4. The method of claim 1, wherein based on the list of identities of the plurality of network devices included in the utility message, the network operator server organizes the plurality of network devices into one or more profile categories including: (i) device type, (ii) device group, (iii) application per broadcasted price category, (iv) M2M ecosystem identities including one or more of: an Application identifier, a Service Capability layer identifier, an M2M node identifier, an M2M Service Connection identifier, an M2M Service Provider identifier, an MSBF identifier, and an M2M Subscription identifier, (v) application type, (vi) service type, (vii) location/area identifiers, (viii) user/subscriber community identifiers, (ix) traffic classes supported by devices, and (x) device priorities.

5. The method of claim 4, wherein the percentage of network devices that are reconnected to the communication network upon reception of the electricity consumption price signal is determined for each profile category.

6. The method of claim 1, wherein the network operator server is a network cloud management unit.

7. The method of claim 6, further comprising allocating cloud resources in accordance with the determined at least one network impact characteristic, by the network cloud management unit.

8. The method of claim 1, wherein the network operator server is a policy charging and control (PCC) node.

9. The method of claim 1, wherein the network operator server is a connection management platform.

10. The method of claim 1, wherein the utility server is a Demand Response Automation Server (DRAS) operating an open Automated Demand Response (openADR) protocol.

11. A network operator server in communication with a utility server over a communication network, the network operator server comprising:
  a processor; and
  a computer readable medium coupled to the processor, said computer readable medium containing instructions executable by the processor, wherein the network operator server is operative to:
    receive, from the utility server over the communication network, a utility message including a list of identities of a plurality of network devices and a schedule for an electricity consumption price signal;
    determine at least one network impact characteristic using the utility message, wherein the determination of the at least one network impact characteristic includes determination of a percentage of network devices, from the plurality of network devices, which are reconnected to the communication network upon reception of the electricity consumption price signal;
    generate characteristics and attributes, of at least one network device of the plurality of network devices, based on the list of identities of the plurality of network devices;
    change, in accordance with the determined at least one network impact characteristic, and the characteristics and attributes of the at least one network device, at least one network policy associated with the at least one network device, wherein the change in the at least one network policy associated with the at least one network device includes readjusting a charging policy for the at least one network device; and
    transmit, according to the schedule for the electricity consumption price signal included in the utility message, information indicative of the change in the at least one network policy, to the at least one network device,
    wherein the at least one network device is a machine to machine (M2M) device including one of: (i) an electric vehicle, (ii) a consumer appliance, (iii) a network node, and (iv) other main-powered mobile or stationary M2M devices.

12. The network operator server according to claim 11, wherein the utility message further includes a state of the at least one network device.

13. The network operator server according to claim 12, wherein the state specifies a network device being in one of: an "on" state in which the network device consumes electricity, an "off" state in which the network device does not consume electricity, and a "standby" state in which electricity consumption by the network device is reduced with respect to the "on" state.

14. The network operator server of claim 11, wherein based on the list of identities of the plurality of network devices included in the utility message, the network operator server organizes the plurality of network devices into one or more profile categories including: (i) device type, (ii) device group, (iii) application per broadcasted price category, (iv) M2M ecosystem identities including one or more of: an Application identifier, a Service Capability layer identifier, an M2M node identifier, an M2M Service Connection identifier, an M2M Service Provider identifier, and an MSBF identifier, and an M2M Subscription identifier, (v) application type, (vi) service type, (vii) location/area identifiers, (viii) user/subscriber community identifiers, (ix) traffic classes supported by devices, and (x) device priorities.

15. The network operator server of claim 14, wherein the percentage of network devices that are reconnected to the communication network upon reception of the electricity consumption price signal is determined for each profile category.

16. The network operator server of claim 11, wherein the network operator server is a network cloud management unit.

17. The network operator server of claim 16, wherein the network cloud management unit allocates cloud resources in accordance with the determined at least one network impact characteristic.

18. The network operator server of claim 11, wherein the network operator server is a policy charging and control (PCC) node.

19. The network operator server of claim 11, wherein the network operator server is a connection management platform.

20. The network operator server of claim 11, wherein the utility server is a Demand Response Automation Server (DRAS) operating an open Automated Demand Response (openADR) protocol.

21. A computer program product for a network operator server, the computer program product comprising a non-transitory computer readable medium storing computer instructions for:
  receiving, from a utility server over a communication network, a utility message including a list of identities of a plurality of network devices and a schedule for an electricity consumption price signal;
  determining at least one network impact characteristic using the utility message, wherein determining the at least one network impact characteristic includes determining, from the plurality of network devices, a percentage of network devices that are reconnected to the communication network upon reception of the electricity consumption price signal;

generating characteristics and attributes, of at least one network device of the plurality of network devices, based on the list of identities of the plurality of network devices;

changing, in accordance with the determined at least one network impact characteristic, and the characteristics and attributes of the at least one network device, at least one network policy associated with the at least one network device, wherein changing the at least one network policy associated with the at least one network device includes readjusting a charging policy for the at least one network device; and transmitting, according to the schedule for the electricity consumption price signal included in the utility message, information indicative of the change in the at least one network policy, to the at least one network device, wherein the at least one network device is a machine to machine (M2M) device including one of: (i) an electric vehicle, (ii) a consumer appliance, (iii) a network node, and (iv) other main-powered mobile or stationary M2M devices.

\* \* \* \* \*